US006509826B1

(12) United States Patent
Loftus

(10) Patent No.: US 6,509,826 B1
(45) **Date of Patent: *Jan. 21, 2003**

(54) FACILITY ACCESS CONTROL

(75) Inventor: Patrick David Loftus, Kingwood, TX (US)

(73) Assignee: PepsiPark U S A Inc., Kingwood, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 09/679,909

(22) Filed: Oct. 5, 2000

Related U.S. Application Data

(63) Continuation of application No. 09/112,963, filed on Jul. 9, 1998, now Pat. No. 6,157,314.

(51) Int. Cl.[7] ........ G05B 19/00

(52) U.S. Cl. ........ 340/5.6; 340/5.2; 340/10.4; 340/5.9; 235/384; 359/155

(58) Field of Search ........ 340/5.6, 10.4, 340/5.61, 5.2, 5.7, 5.9, 928, 10.33, 10.42, 5.62, 636; 235/384, 381, 375; 359/155, 162, 170

(56) References Cited

U.S. PATENT DOCUMENTS 2,637,920 A 5/1953 Stratton et al.
4,325,146 A 4/1982 Lennington ........ 455/604
4,360,796 A 11/1982 Shocknesse ........ 340/51
5,475,377 A 12/1995 Lee ........ 340/825.34
5,498,859 A 3/1996 Farmont ........ 235/384
5,507,378 A 4/1996 Leone ........ 194/202
5,819,234 A 10/1998 Slavin et al. ........ 705/13
5,905,247 A 5/1999 Ilén ........ 235/384
6,157,314 A * 12/2000 Loftus ........ 340/5.6

* cited by examiner

*Primary Examiner*—Michael Horabik
*Assistant Examiner*—William Bangachon
(74) *Attorney, Agent, or Firm*—Charles J. Rogers; Henry L. Ehrlich; Winstead Sechrest & Minick P.C.

(57) ABSTRACT

Method and apparatus for controlling access to or from a facility associated with providing services and/or sales of merchandise. The facility has an automatically operated, normally closed access gate and a scanner. Patrons may access the facility free of charge or at a discount by displaying an article of merchandise such that the scanner reads a bar code inscribed upon the merchandise. Data corresponding to the scanned bar code is compared to data entered into the memory of an automated data processing device. If that comparison results in establishing a correlation between data from the scanned merchandise and data entered into memory corresponding to merchandise for which a discount is accorded, then a control signal is generated and transmitted to the access gate. The access gate then opens and allows the patron submitting merchandise for scanning to enter or leave the facility.

15 Claims, 1 Drawing Sheet

FACILITY ACCESS CONTROL

This application is a continuation of U.S. patent application, Ser. No. 09/112,963 filed on Jul. 9, 1998, now U.S. Pat. No. 6,157,314.

BACKGROUND

1. Field of the Invention

The present invention relates to method and apparatus for controlling access to or from a facility. A gate or equivalent barrier to control entry to or exit from a facility is opened by passing merchandise purchased at the facility across a sensor. When the sensor detects indicia or equivalent encoded data that identifies the merchandise as having been available for sale at the facility, the barrier, which is normally closed, is automatically opened.

2. Description of Related Art

Retail and other facilities, such as entertainment parks or areas, have ingress and egress points that limit access to patrons. Often times these facilities offer parking areas for a fee and may additionally require a fee for access to the facility in addition to a parking fee.

In some cases, a parking facility is merely a paved or unpaved lot offering unrestricted access to a public road. However, in areas where real estate is expensive, or where construction of a parking facility entails burdensome costs to the owner or operator of the sales facility, it may not be feasible to provide unlimited access to the parking facility.

Various practices for providing parking to patrons of sales facilities are known. In one scheme, entry is unrestricted, but egress is permitted by personnel staffing an exit gate. Patrons leaving the parking facility after completing purchases are required to display sales receipts, vouchers, or similar evidence of being bona fide, paying patrons.

Some parking facilities have automated egress control. That is, the gate or barrier preventing egress is operated by a data bearing device, such as a magnetically encoded card which is inserted into a card reader. Recognition of the encoded card results in opening of the barrier. A number of variations of this concept exist. For example, in place of an encoded card, a keypad is provided at the exit gate. A patron punches a pre-arranged code, such as an identification number or alphanumeric code, to effect opening of the gate.

U.S. Pat. No. 2,637,920, issued to Glen S. Stratton et al. on May 12, 1953, discloses a parking facility in which entry is uncontrolled and egress is controlled. U.S. Pat. No. 5,498,859, issued to Johann Farmont on Mar. 12, 1996, describes access by a card reader.

Schemes for automatically reading a data record borne upon a motor vehicle are utilized by some municipalities to control passage of traffic. In most cases, the purposes of such schemes are to allow authorized entry, or to expedite passage through a municipally managed toll gate.

SUMMARY

The present invention enables a facility having controlled access to operate automatically, in the sense that no human personnel is required to operate an access and/or egress gate. At the same time, access is restricted to paying customers of the facility. This is accomplished by scanning merchandise purchased at the facility as the customer accesses the facility. If scanning results in a determination that the merchandise was sold at the facility, then a signal is generated which automatically opens the access gate.

It is preferred that data encoded on or borne by the merchandise not be specially provided merely to expedite operation of the access gate. To this end, it is possible to utilize standard Universal Product Code ("UPC") bar coding that has already been inscribed upon merchandise intended for mass distribution by the manufacturer for the purpose of assisting in standardizing and scanning of pricing, maintaining inventory control, and monitoring sales.

As an alternative, merchandise can be encoded specifically for use at individual facilities. Custom application of encoding for use at facilities can be accomplished through the use of non-standard bar coding, or by applying alternative encoding indicia such as a magnetized metallic strip or a multiple bar code configuration. With the use of a magnetized metallic strip, the strip may be de-magnetized upon exit from the facility to prevent the patron from re-using the product. With the use of a multiple bar code configuration, additional non-standard bar coding can be used for data gathering to track data regarding sales and geographic regional territory product distribution, or may be used for periodic security code variations.

In a preferred embodiment, equipment required at the access gate includes an optical scanner and connection to an automated data processing device having a memory which has been loaded with data corresponding to that displayed upon the merchandise. If the data relied upon is the standard UPC bar coding provided by the manufacturer of the merchandise, then it is possible that the data be entered into memory when initially stocking inventory, or in another operation which obviates necessity for a separate step of entering data into memory. In the alternative embodiment using a magnetized strip, the optical scanner will be replaced with a magnetic sensor, which may also include a de-magnetizer to ensure that the product is not re-used.

It will be seen that known components may be utilized in order to practice the invention. Automated access gates are known; optical scanners, magnetic sensors, and de-magnetizing devices are known; suitable automated data processing devices are known; and suitable algorithms for carrying out the necessary comparison are known.

The sales facility may, for example, comprise a staffed facility, having amenities such as a sales counter, cashier, and cash register, or alternatively, may be automated. For example, some or all of the sales may be conducted by vending machine. The sales facility could also comprise only that portion of an entire sales operation wherein merchandise is only dispensed. In the latter case, merchandise could be pre-purchased, or paid for at another location. The consumer merchandise may be obtained in the facility or exterior of the facility and utilized for entry to the facility or parking.

The facility may comprise a multistory structure, an unadorned lot, or may be part of the sales facility or still another structure, such as the garage of a building. Although access is controlled through a gate or similar structure for regulating ingress or egress, this does not necessarily imply that the facility have walls or other structure preventing access at points other than the access gate. For example, in an urban setting, the facility could be an unadorned plot of land surrounded by buildings owned by parties not associated with the subject commercial premises. Regardless of the nature of the parking lot or facility, it is most likely although not necessary that structure is provided preventing egress through an exit gate. The present invention combines these elements to arrive at a resulting novel system for controlling access to or from a facility.

Accordingly, it is an object of the invention to provide automatic control of access to or from a parking facility associated with a sales facility, responsive to determining that an entering or exiting party has an article of merchandise.

It is another object of the invention to provide method and apparatus for sensing data inscribed upon an article of merchandise and comparing the sensed data with stored data corresponding to stocked merchandise, having pre-loaded the stored data into memory, to arrive at a determination that merchandise has indeed been purchased at the sales facility.

It is a further object of the invention to utilize data which is customarily inscribed upon merchandise, rather than to require that data primarily utilized for operation of the access control be inscribed on the merchandise.

Still another object of the invention is to utilize data from standard UPC bar coding, and to utilize optical scanning of bar codes by conventional scanning apparatus.

It is a further alternative object of the invention to utilize non-standard bar coding or other encoding indicia, such as a magnetized metallic strip, to identify merchandise which can be used to control access to or from a facility.

An additional object of the invention is to utilize known components in carrying out the invention.

It is an object of the invention to provide improved elements and arrangements thereof in an apparatus for the purposes described which is inexpensive, dependable, and fully effective in accomplishing its intended purposes.

These and other objects of the present invention will become readily apparent upon further review of the following description and drawings.

BRIEF DESCRIPTION OF THE DRAWINGS

Various other objects, features, and attendant advantages of the present invention will become more fully appreciated as the invention becomes better understood when considered in conjunction with the accompanying drawings, in which like reference characters designate the same or similar parts throughout the several views.

DETAILED DESCRIPTION

Figure 1:
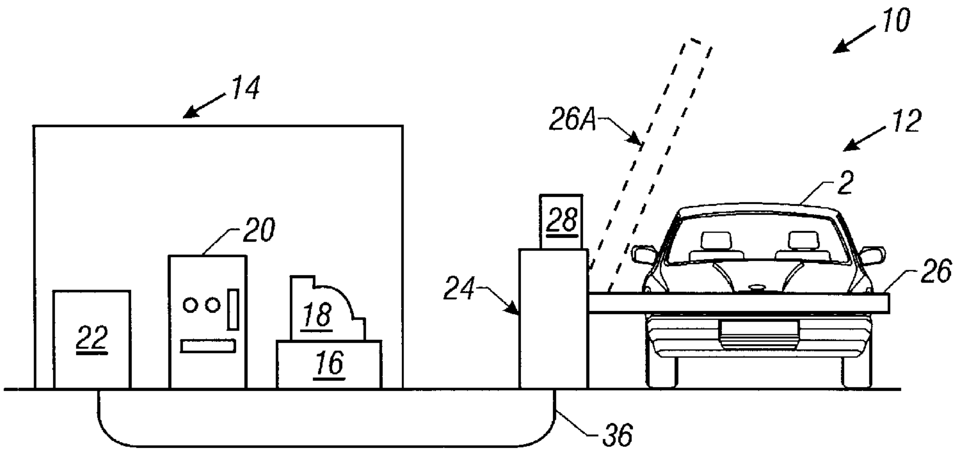
FIG. 1 is an environmental, diagrammatic view of the invention.

FIG. 1 of the Drawings shows commercial premises 10 which is to be automatically controlled by selectively enabling access of motor vehicles 2 to or from a parking facility 12 associated with premises 10, responsive to sensing of data borne upon merchandise purchased at premises 10. Premises 10 include a sales facility 14 for stocking and vending merchandise.

Figure 2:
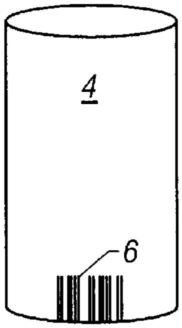
FIG. 2 is a perspective, diagrammatic detail view illustrating representative merchandise available for purchase within a sales facility associated with the invention.

As shown in FIG. 2, merchandise, exemplified as a beverage can 4, has identifying data inscribed or otherwise disposed thereon. In the example illustrated, data is in the form of indicia visible from the exterior of the merchandise, such as a bar code 6 disposed externally upon can 4.

Returning to FIG. 1, sales facility 14 has apparatus for vending merchandise, such as a sales counter 16 having a cash register 18, one or more vending machines 20, or both. Sales facility 14 also has a computer 22 or the like for maintaining automated records. Computer 22 may be utilized to record inventory, control cash register 18, and even maintain records generated by vending machines 20. Identifying data of the merchandise is entered into the memory of computer 22. This may be accomplished when ordering or stocking the merchandise, or in a separate operation prior to or after ordering and stocking.

Parking facility 12, which is proximate if not immediately adjacent sales facility 14, has spaces for parking motor vehicles 2, and an access gate 24. Access gate 24 includes a movable barrier 26 or equivalent structure for preventing access of motor vehicles 2 to or from parking facility 12. Access gate 24 may be a conventional control gate wherein barrier 26 moves to a position removing obstruction of motor vehicle 2 to or from access. An exemplary position of barrier 26 is indicated in broken lines at 26A.

Access gate 24 comprises a system for elevating barrier 26 automatically. This system may include generally conventional apparatus for its operation.

Access gate 24 further has a sensor, such as optical scanner 28, which forms part of a control system for automatically operating access gate 24. The sensor senses identifying data borne by merchandise stocked within and subsequently removed from premises 10. In a preferred embodiment, the sensor comprises optical scanner 28 capable of reading indicia external to or visible from the exterior of the merchandise. This arrangement enables the control system to utilize bar coding 6 for successful operation, rather than requiring indicia or other data to be provided specifically for this purpose. Of course, identifying data other than bar coding 6 could be utilized should a specific application of the invention benefit from such a variation.

Figure 3:
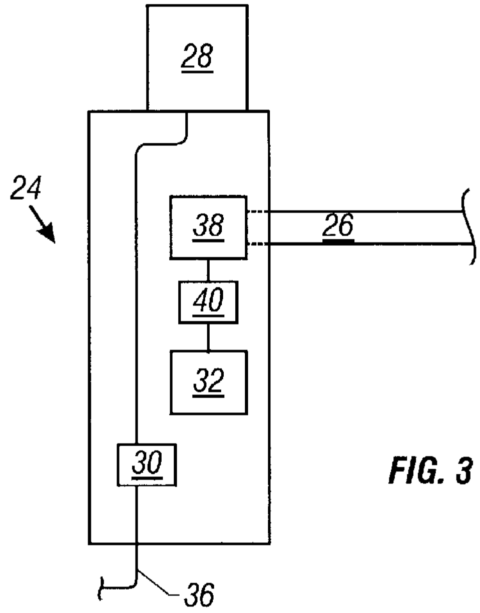
FIG. 3 is a diagrammatic detail view of a component shown at the right of FIG. 1.

Turning now to FIG. 3, additional components of the control system will be discussed. The control system has data processing apparatus 30 for comparing sensed identifying data from the merchandise with identifying data stored in the memory of computer 22 (see FIG. 1). When comparison of sensed identifying data establishes a correlation with data previously entered into memory, data processing apparatus 30 generates a signal which is transmitted to a control signal apparatus 32.

Control signal apparatus 32 generates a control signal amplified in power over that generated by data processing apparatus 30, and transmits this control signal to an access control apparatus. Control signal apparatus 32 includes an amplifying circuit (not shown), for transmitting a signal to the access control apparatus of power sufficient to operate the same.

Access gate 28 includes certain conventional components for moving barrier 26, such as a motor and drive assembly 38 and a motor controller 40 for operating assembly 38. The access control apparatus comprises assembly 38 and controller 40. Controller 40 includes a relay (not separately shown) or the like, for completing a power circuit (not shown) from the electrical system of premises 10 to assembly 38. The amplified signal originating at control signal apparatus 32 operates the relay or its equivalent switching device.

In the arrangement depicted in FIGS. 1 and 3, computer 22 is depicted as being located in sales facility 14, and communicating through an underground communications cable 36 with other components disposed within access gate 28. This arrangement is for clarity only, and it will be understood that the necessary components of the control system may be located at any suitable location. Illustratively, all data processing components and even controller 40 may be located within or proximate computer 22.

Electrical signals may be conducted among the various components of the control system in hardwired fashion, as indicated by lines connecting the various components in FIGS. 1 and 3. This form of communication is exemplified by cable 36. Alternatively, communication may be by radio frequency, optical beam, or still other forms of energy not requiring members spanning and mechanically connected to the various individual components.

It will be understood that premises 10 are provided general purpose electrical power circuits. It will further be understood that the control system is provided with an AC-to-DC converter or power supply (neither shown) which is connected to one general power circuit or is provided with energy independently of the power circuit, such as a battery. This converter or power supply may be integral with any component of the control system recited above, or may form a separate component appropriately connected to one or more components of the control system. Converters and power supplies are well known and need not be set forth in greater detail herein.

Similarly, memory systems for automated data processing devices and algorithms for accomplishing comparisons of one set of data with a second set of data are well known. Any suitable memory system, data processor, and algorithm will be adequate as long as it meets the functional requirements set forth herein.

Figure 4:
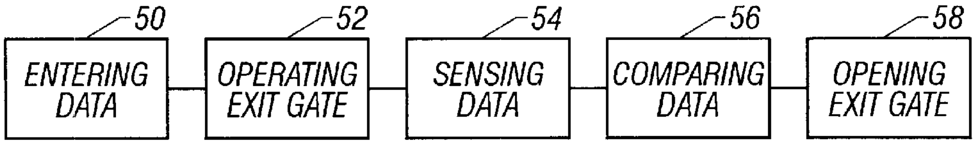
FIG. 4 is a block diagram showing steps of a method of practicing the invention, and is read from left to right.

A preferred embodiment of the invention may also be regarded as comprising a method of controlling access to or from commercial premises including a sales facility and a parking facility having an access gate, as well as comprising apparatus therefore. In the preferred method described as follows, the access gate functions as an exit gate with unobstructed entry to the parking facility, although it is readily apparent that the method may be reversed by using a controlled entry gate with an unobstructed exit. A preferred embodiment of the inventive method may be said to comprise at a minimum, the following steps. As summarized in FIG. 4, the method comprises a first step 50 of entering into the memory of an automated data processing device identifying data correlating to the identifying data borne upon merchandise available for vending. As mentioned above, this step 50 may be accomplished in a peripherally related operation, such as recording an initial stock order.

Another step 52 of the method is operating an automatically controlled exit gate of a parking facility, where the exit gate controls egress from the parking facility.

A further step 54 is sensing identifying data, such as a bar code, borne on merchandise as the merchandise is being removed from the parking facility through the exit gate in a motor vehicle. Sensed data is then converted into a form which can be processed by the automated data processing device, and communicated to the automated data processing device and entered into memory of the automated data processing device for further processing.

This further processing comprises the next step 56 of the method, wherein sensed data is compared to data previously entered into the memory of the automated data processing device.

The last step 58 is automatically opening the exit gate responsive to establishing correlation between sensed identifying data and identifying data previously entered into memory when comparing the two sets of identifying data.

While certain steps must be performed in chronological order, it is obvious that other steps occur in random or non-critical order. The steps of scanning, comparing scanned data to previously entered data, and opening the access gate must obviously be taken in listed order.

Figure 5:
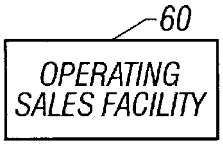
FIGS. 5 and 6 are block diagrams illustrating optional steps each amplifying upon the method of FIG. 4.

In most cases, the sales facility dispensing the merchandise being sensed for data is commercially linked to the parking facility. Therefore, referring now to FIG. 5, the novel method as set forth above may be amplified by adding a step 60 of operating a sales facility vending merchandise bearing data detectable by a sensor.

Figure 6:
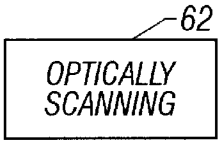

With reference to FIG. 6, the novel method may more specifically be related to exploiting bar coding by modifying step 56 to comprise a step 62 of scanning visible indicia with an optical scanner. This step 62 is not limited to reading bar coding, but rather may refer to reading any indicia visible from the exterior of the merchandise. The novel method may also encompass all of steps 50, 52, 54, 56, 58, 60, and 62 in combination.

Identifying data may be other than visible indicia, such as a bar code: it may comprise a magnetically encoded member, it may comprise an optical mask or template, such as punching a series of holes or recognizable symbols through a tag attached to the merchandise, or still other forms of placing data onto merchandise available for sale. If such forms of identifying data are utilized, then the sensor sensing the data at the access gate would be of a type compatible for sensing the modified form of the data.

It is to be understood that the present invention is not limited to the embodiments described above, but encompasses any and all embodiments within the scope of the following claims.

I claim:

1. An automatically controlled access barrier system for limiting ingress to and/or egress from a facility, said system comprising:

a facility having a normally closed access gate and an access barrier controller, wherein said facility allowing access by presentation of consumer merchandise bearing identifying data, said consumer merchandise having a purpose independent of its identifying data bearing function; and a control system configured to automatically operate the access barrier controller, the control system comprising:

a sensor configured to sense identifying data borne by consumer merchandise;

a memory device configured to store identifying data borne by said consumer merchandise acceptable for access;

a data processor programmed to compare sensed identifying data with said identifying data stored in the memory device; and said data processor further comprising a signal generator configured to generate a control signal and to transmit the control signal to said access barrier controller upon correlation by said data processor of said sensed identifying data with said identifying data stored in the memory device and acceptable for access.

2. The system of claim 1, wherein said facility includes a vending machine carrying said consumer merchandise carrying said identifying data for allowing access to said facility.

3. The system of claim 1, wherein said identifying data borne by said consumer merchandise is in the form of indicia visible from the exterior of said consumer merchandise, and wherein said sensor is a scanner capable of reading said indicia.

4. The system of claim 3, wherein said facility includes a vending machine carrying said consumer merchandise carrying said identifying data for allowing access to said facility.

5. The system of claim 1, wherein said facility includes a motor vehicle parking area.

6. The system of claim 1, wherein said facility is an entertainment facility.

7. The system of claim 6, wherein said facility includes a motor vehicle parking area.

8. A method of controlling access to or from a facility utilizing an article of consumer merchandise, comprising the steps of: entering into the memory of an automated data processing device identifying data correlating to the identifying data borne by consumer merchandise acceptable for access to a facility, wherein said consumer merchandise has a purpose independent of its identifying data bearing function; sensing identifying data borne by said consumer merchandise; comparing sensed identifying data with said identifying data entered into said memory of said automated data processing device; and opening an access gate responsive to the establishment of a correlation between sensed identifying data and said identifying data entered into memory acceptable for access allowing a patron to enter or exit a facility.

9. The method of claim 8, wherein the identifying data borne upon said consumer merchandise is indicia visible from the exterior of said consumer merchandise.

10. The method of claim 8, further comprising the step of:

selling said consumer merchandise at said facility.

11. The method of claim 9, further comprising the step of:

selling said consumer merchandise at said facility.

12. The method of claim 8, wherein said facility includes a motor vehicle parking area.

13. The method of claim 12, further comprising the step of:

selling said consumer merchandise at said facility.

14. A method of controlling access to or from a facility utilizing an article of consumer merchandise, comprising the steps of: operating a facility having an automatically controlled access gate controlling access to or from said facility and an optical scanner disposed proximate the access gate; entering into the memory of an automated data processing device identifying data correlating bar coded identifying data borne upon consumer merchandise which is acceptable for access, wherein said consumer merchandise has a purpose independent of its identifying data bearing function; optically scanning said bar code visible on said consumer merchandise as said consumer merchandise is being passed by said scanner and converting said scanned bar code into a form which can be processed by said automated data processing device; communicating scanned and converted data to the automated data processing device and operating said automated data processing device to compare identifying data obtained by scanning with said identifying data entered into the memory of said automated data processing device; and automatically opening said access gate responsive to establishing correlation between said identifying data obtained by scanning and said identifying data entered into said memory acceptable for access.

15. The method of claim 14, wherein said facility includes a motor vehicle parking area.

* * * * *